1

2,964,463

UPGRADING HYDROCARBON OILS IN THE PRESENCE OF HYDROGEN WITH A TUNGSTEN OXIDE, MOLYBDENUM OXIDE ON SILICA-ALUMINA CATALYST COMPOSITE

Elmer L. Miller, Cary, and Hillis O. Folkins, Crystal Lake, Ill., assignors to The Pure Oil Company, Chicago, Ill., a corporation of Ohio No Drawing. Filed Dec. 10, 1956, Ser. No. 627,512

5 Claims. (Cl. 208—110)

This invention relates to a process for treating hydrocarbons and to improvements in hydrocarbon conversion processes utilizing catalyst compositions comprising a minor proportion of a catalytically active, two-component promoter material in combination with a silica-alumina carrier. More specifically, the invention relates to improvements in hydrocarbon conversions involving hydrogenation such as hydrodesulfurization of petroleum fractions, hydrotreating lubricating oil stocks and upgrading hydrocarbons prior to catalytic cracking, using catalyst compositions comprising alumina-silica carrier in combination with a minor proportion of active oxide promoters consisting of molybdenum and tungsten oxides wherein the molybdenum oxide is present as a major component of the promoter and the tungsten oxide is present as a minor component of the promoter. More particularly, the invention relates to an improved process for upgrading hydrocarbons, such as petroleum fractions, virgin gas oils, catalytic cycle stocks, and especially materials containing appreciable amounts of unsaturates of the straight-chain and cyclic variety to produce products of superior character for maximum conversion to gasoline in a subsequent catalytic cracking operation.

The invention is to be distinguished from those processes in the prior art which teach, in general, catalyst compositions comprising an alumina carrier in combination with a minor proportion of an active oxide of a metal of the left-hand columns of groups IV, V and VI of the periodic table for use in various types of reactions including hydrogenation, dehydrogenation, aromatization and reforming. The prior art has proposed various promoters for molybdenum oxide containing catalysts including aluminum oxide, certain metals, zinc oxide, magnesia, carbon, silica, boron, etc., for use in distinctive hydrogenation processes wherein hydrocarbons of high boiling point, such as coal tar, asphalt, bitumen and various fractions of these substances, are transformed into products of lower boiling point. It is known that certain catalysts appear to affect predominantly the carbon-to-carbon bonds, while others affect mainly the carbon-to-hydrogen bonds. Silica is known to influence reactions involving carbon-to-carbon bonds to a greater extent than alumina. Thus, for some types of dehydrogenation reactions, the use of alumina is quite common but silica is often avoided. In certain instances a small amount of silica will promote dehydrogenation when in combination with alumina. The combination of an alumina carrier impregnated with minor amounts of chromia and beryllia, with or without small amounts of silica, is a well-known dehydrogenation catalyst. Many teachings in the art point to cobalt and molybdenum oxide combinations on alumina, with or without silica, as superior hydrogenation catalysts.

The present invention relates primarily to an improvement over these prior art teachings, and shows that a particular combination of promoters comprising molybdenum oxide and tungsten on a silica-alumina support is unexpectedly superior. It has been found that by using amounts of tungsten oxide between about 1 to 10% by weight and amounts of molybdenum oxide between about 4 to 15 percent by weight, supported on an acidic-type carrier, such as a silica-alumina cracking catalyst base, a highly active catalyst is formed for use in hydrogenating and upgrading naphthas or petroleum fractions. Further, it has been found that a catalyst composition comprising a support of about 95 percent by weight of alumina and 5% by weight of silica, plus active hydrogenation components comprising about 14% by weight of molybdenum oxide (or 9.4% to 10.01 by weight of molybdenum) and 5.0 to 6.3 wt. percent of tungsten oxide, based on the total catalyst, is a superior hydrogenation catalyst useful in the aforementioned reactions. Also, a part of this invention relates to the discovery that petroleum fractions which have been dydrogenated in the presence of the aforesaid catalyst compositions at about 700° to 800° F. and 600 to 800 p.s.i.g. pressure may be converted into gasoline in high yields, with less coke and gas formation.

Accordingly, it becomes a primary object of this invention to provide an improved catalytic hydrogenation process.

A second object of this invention is to provide a new catalyst composition for use in hydrogenating olefinic hydrocarbon fractions.

A third object of the invention is to provide a combination hydrogenation and cracking process directed to the production of high yields of gasoline with less coke and gas formation.

Another object of the invention is to provide a new catalyst composition for hydrogenation reactions comprising an acidic-type cracking catalyst base with a promoter comprising combinations of molybdenum and tungsten oxides in certain weight proportions.

Still another object of the invention is to provide a process for hydrogenating olefinic and aromatic stocks at about 750° F. and 700 p.s.i.g., employing a catalyst comprising about 6.3 wt. percent tungsten oxide and 14.1 wt. percent molybdenum oxide on an alumina-silica support containing 5% silica.

These and other objects of the invention will be described or become apparent as the description thereof proceeds.

In order to demonstrate the invention, a catalytic cycle stock having the following characteristics,

| | |
|---|---:|
| IBP _____° F__ | 435 |
| EP _____° F__ | 629 |
| Gravity, ° API _____ | 30.5 |
| Mol. wt. _____ | 200 |
| RI, $n^{20}{}_D$ _____ | 1.4948 |
| Sulfur, wt. percent _____ | 0.22 |
| Olefins, vol. percent _____ | 7.2 |
| Aromatics, vol. percent _____ | 36.4 | which was obtained from a commercial catalytic cracking operation over a synthetic silica-alumina catalyst, was subjected to hydrogenation under the following conditions:

| | |
|---|---:|
| Reactor temperature _____° F__ | 750 |
| Pressure _____p.s.i.g__ | 700 |
| Space velocity _____LVHSV__ | 1.5 |
| $H_2$/HC ratio (Mol) _____ | 5.0 | using the different catalyst compositions indicated in Table I.

Referring to Table I, it is seen that by using the API gravity and the refractive index as a measure of the degree of hydrogenation, the cobalt-molybdenum oxide catalysts (runs #1, 2 and 3) increase the API gravity

TABLE I

*Hydrogenation of heath catalytic cycle stock*

| Run No. | Catalyst Composition | | ° API | RI $n_D^{20}$ | S, Wt. Percent | Olefins, Vol. Percent |
|---|---|---|---|---|---|---|
| | Active Components (wt. percent of catalyst) | Support | | | | |
| 1 | 2% CoO, 8% MoO₃ | alumina | 31.9 | 1.4861 | 0.03 | 1.7 |
| 2 | 3.1% CoO, 9.3% MoO₃ | alumina-silica (5%) | 32.2 | 1.4851 | 0.03 | 0.9 |
| 3 | 3.0% CoO, 10.4% MoO₃ | alumina | 32.3 | 1.4840 | 0.02 | 3.8 |
| 4 | 6.3% WO₃, 14.1% MoO₃ | alumina-silica (5%) | 34.0 | 1.4795 | 0.03 | 0.3 |
| 5 | 7.3% Cr₂O₃, 13.9% MoO₃ | alumina-silica (5%) | 32.5 | 1.4839 | 0.03 | 1.2 |
| 6 | 3.7% CoO, 12.1% MoO₃ | alumina | 32.4 | 1.4840 | 0.03 | 0.7 |
| 7 | 20.0% MoS₂ | alumina | 32.0 | 1.4853 | 0.06 | 0.9 |
| 8 | 2.5% WO₃, 3.0% CoO, 9.1% MoO₃ | alumina-silica (5%) | 32.8 | 1.4830 | 0.04 | 1.1 | of the catalytic cycle stock from 30.5° to a range of about 32.0 to 32.4° and reduce the refractive index from 1.4948 to a range of about 1.4840 to 1.4860. The presence of increased molybdenum oxide in the catalysts of runs #2 and 3 may have a marginal effect, but the inclusion of silica (run #2) shows no effect on the end results. Since the feed contains a considerable amount of sulfur, the metal oxide components of the catalysts might be at least partly converted to the sulfide form which theoretically may be the active hydrogenation component, a theory advance by some skilled in the hydrogenation art. As seen from run #7, however, even starting with all of the molybdenum present as the sulfide, and in increased proportions, does not improve the results.

On the other hand, the catalyst of run #4, containing tungsten oxide and molybdenum oxide on an alumina support with 5% of silica, gives rise to a product which is far different from the products obtained with the other catalysts. This is shown by the high gravity (34° API) and the low refractive index (1.4795), as well as the depletion of the olefins. Runs #5 and 6 show that combinations of chromia and molybdenum oxide or cobalt oxide and molybdenum oxide are inferior to molybdena and tungsten oxide. Run #8 shows that the addition of cobalt oxide to the molybdenum oxide-tungsten oxide combination results in a catalyst of much lower activity. Also, contrary to the art and quite unexpected is the showing in run #5 in comparison with run #4, viz., that replacing the tungsten oxide with chromia, a well-known hydrogenation promoter, greatly decreases the hydrogenation activity. It is thus apparent that, contrary to the prior art, molybdenum oxide and chromia are not equivalents in catalyst compositions for this reaction.

To show the effects of tungsten oxide alone on alumina, data are presented in Table II on the hydrogenation of another catalytic cycle stock having different properties. The feed used to obtain this data in Table II had the following characteristics:

| | |
|---|---|
| IBP | ° F.. 416 |
| EP | ° F.. 732 |
| Gravity, ° API | 25.8 |
| Mol. wt. | 215 |
| RI, $n_D^{20}$ | 1.5170 |
| Sulfur, wt. percent | 0.55 |
| Olefins, wt. percent | 3.2 |
| Aromatics, wt. percent | 40.9 |

The reaction conditions for the hydrogenation runs shown in Table II are the same as for those of Table I.

TABLE II

*Hydrogenation of Toledo catalytic cycle stock*

(BLEND OF 1 LIGHT/2 HEAVY)

[Conditions: 750° F.; 700 p.s.i.g.; 1.5 LVHSV; Ratio of H₂/HC (mol)=5]

| Run No. | Catalyst Composition | | ° API | RI $n_D^{20}$ | S, Wt. Percent | Olefins, Vol. Percent |
|---|---|---|---|---|---|---|
| | Active Components (wt. percent of catalyst) | Support | | | | |
| 9 | 2% CoO, 8% MoO₃ | alumina | 27.8 | 1.5041 | .06 | 0.5 |
| 10 | 3.1% CoO, 9.3% MoO₃ | alumina-silica (5%) | 27.8 | 1.5058 | .07 | 0.5 |
| | | | ¹ 27.4 | 1.5074 | .11 | 0.5 |
| 11 | 10.2% WO₃ | alumina | ² 26.2 | 1.5132 | .47 | 0.8 |

¹ LVHSV—3.0; other conditions same as described in heading.
² LVHSV—2.0; other conditions same as described in heading.

In Table II, the catalyst used in run #9 is the same as that used in run #1 of Table I. The catalyst used in run #10 is the same as that used in run #2 of Table I. Table II again shows that the two cobalt-molybdenum oxide catalysts are of about equal activity. Run #11 shows inferior activity pointing to the conclusion that the superior activity obtained using the catalyst of run #4 (Table I) is not due to the catalytic activity of the tungsten oxide alone, but to the combination of molybdenum oxide and tungsten oxide. Thus from these experiments it is seen that neither molybdenum oxide on alumina, nor tungsten oxide on alumina can account for the high activity of their composite. Also, it is shown that the inclusion of silica in the alumina support does not increase the activity of the various other catalysts with which a comparison is made, whereas a very active catalyst results in the molybdenum oxide-tungsten oxide-silica combination on alumina.

To further demonstrate the invention, a series of experiments was conducted in which the hydrogenated cycle stocks or products from runs numbered 1, 2 and 4 were subjected to catalytic cracking under the following conditions:

| | |
|---|---|
| Temperature | 800° F. (reactor), 810° F. (preheat). |
| Pressure | Atmospheric. |
| Cycle time | 10 minutes on stream. |
| Space velocity | 1.5 LVHSV. |
| Catalyst volume | 200 ml. |
| Charge rate | 300 ml./hr. | to make a comparison with the treatment of a cycle stock which had not been hydrogenated (run 12) In carrying out these catalytic cracking tests, a pelleted commercial synthetic catalyst was employed. The composition of this catalyst was 87 weight percent silica and 13 weight percent alumina. Fresh charges of catalyst were used in each cracking experiment.

from the hydrogenated product which has been treated in the presence of the catalyst compositions of this invention, were obtained by the Houdry Cat-A test, the Distillation-Plus-Loss test, as is widely known and used in the art. A detailed discussion of same is to be found in the article entitled "Standard Laboratory Method for the Determination of Cracking Catalyst Activity," by J. Alexander, Jr., API Proceedings, 27th Annual Meeting, vol. 27 (III), 1947, page 51. Although a specific catalyst was used during the cracking reactions reported in Table III, any catalytic cracking catalyst may be used when it is desired to utilize the invention for upgrading hydrogenated cycle stocks or other products as before enumerated. The cracking step may be carried out at temperatures varying from about 500° F. to 1000° F. or higher, depending on the type of feed to be treated after its initial hydrogenation. The conditions of this

TABLE III

| Hydrogenated Product from— | Cracking Data | | | | | Ratio | |
|---|---|---|---|---|---|---|---|
| | Conv., Percent Vol. | Gasoline, Vol. Percent | Coke, Wt. Percent | Gas Wt. Percent | Increase in Gasoline, Percent | gasoline/coke | gasoline/gas |
| Run #1 | 47.7 | 36.7 | 3.6 | 6.6 | 17.6 | 10.3 | 5.6 |
| Run #2 | 48.6 | 36.7 | 3.6 | 6.4 | 17.6 | 10.3 | 5.7 |
| Run #4 | 51.3 | 41.9 | 3.1 | 5.9 | 34.3 | 13.4 | 7.1 |
| Run #12 (not hydrogenated) | 42.0 | 31.2 | 4.6 | 5.8 | 0 | 6.8 | 5.4 |

As illustrated by the results in Table III, the catalyst used in run No. 4, containing 6.3 percent of tungsten oxide and about 14 percent molybdenum oxide on an acidic-type support composed of 5% of silica and 95% alumina, not only effects a much greater degree of upgrading upon hydrogenation, but also gives a product which on cracking yields 41.9 percent of gasoline, an increase of 34.3 percent over that obtained by cracking the unhydrogenated product and a 14.2 percent increase over that obtained with other hydrogenation catalysts.

The superiority of this catalyst is shown also by the increased selectivity obtained in the catalytic cracking of the hydrogenated cycle stock resulting from processing over this catalyst. This is illustrated in the gasoline/coke and the gasoline/gas ratios presented in Table III. The non-hydrogenated cycle stock, upon catalytic cracking, showed gasoline/coke and gasoline/gas ratios of 6.8 and 5.4, respectively, at a gasoline yield of 31.2 volume percent. The hydrogenated products from runs #1 and #2 (cycle stock hydrogenated over cobalt-molybdate catalysts) show greater selectivity on catalytic cracking than does the non-hydrogenated stock, but still more striking, is the high selectivity obtained in the catalytic cracking of the product from hydrogenation of the cycle stock over the catalyst composed of molybdenum oxide-tungsten oxide on alumina (containing 5 percent silica) support. As shown in Table III, with the catalysts of this invention, gasoline/coke and gasoline/gas ratios were 13.4 and 7.1, respectively. These ratios are much higher than those obtained (10.3, 10.3 and 5.6, 5.7) when the products from hydrogenation over cobalt-molybdate catalysts were catalytically cracked. Hence, the hydrogenated product from the catalysts disclosed herein gives cracking selectivity greater than do those obtained with cobalt molybdate catalysts, even though cracking conversion and yields are much higher in the former case, and therefore lower selectivity normally would be expected.

The results shown in Table III wherein increased selectivity and lower gasoline/coke ratios are obtained step are well known, do not constitute the essence of the invention, and may be subjected to other variations as to space velocities, type of catalyst, type of reactor, and pressure.

In addition to the foregoing considerations the catalyst compositions of this invention may be applied to hydrotreating of lubricating oil stocks and the hydrodesulfurization of petroleum fractions where increased hydrogenation activity is important.

Since the conditions of these reactions are well known, it suffices to say that the catalysts of this invention will find application in any process where hydrogen is reacted with a carbon-carbon double bond, where cyclization or hydrogenation of ring-type compounds is promoted, and in hydrogen treating processes such as desulfurization or removal of acids, nitrogen compounds, and the like.

What is claimed is:

1. The process of upgrading catalytic cycle stock for use in producing hydrocarbons boiling in the gasoline boiling range which comprises subjecting said catalytic cycle stock to hydrogenation with controlled hydrocracking at temperatures of about 700° to 800° F. in the presence of a catalyst comprising about 5.0 to 6.3 percent by weight of tungsten oxide and about 14.0 percent by weight of molybdenum oxide supported on a silica-alumina carrier comprising about 5.0 percent by weight of silica and about 95.0 percent by weight of alumina and recovering a hydrogenated product of decreased olefin content and increased API gravity.

2. The process in accordance with claim 1 in which the catalyst contains about 6.3 weight percent of tungsten oxide.

3. The process in accordance with claim 1 in which the catalytic cycle stock has a boiling range of about 435° F. to 629° F. and a gravity of about 30.5° API and said hydrogenation is carried out at a temperature of about 750° F., using a pressure of about 700 p.s.i.g. in the presence of about 5.0 mols of hydrogen per mol of said cycle stock.

4. A catalyst composition consisting of about 5.0 to 6.3 percent by weight of tungsten oxide and about 14.0 percent by weight of molybdenum oxide supported on a carrier comprising about 5.0 percent of weight of silica and about 95.0 percent by weight of alumina.

5. A catalyst composition in accordance with claim 4 in which the content of tungsten oxide is about 6.3 percent by weight.

References Cited in the file of this patent

UNITED STATES PATENTS

| | | |
|---|---|---|
| 2,650,906 | Engel et al. | Sept. 1, 1953 |
| 2,708,180 | Fuener et al. | May 10, 1955 |
| 2,744,052 | Nozaki | May 1, 1956 |
| 2,792,336 | Kubicek et al. | May 14, 1957 |
| 2,799,626 | Johnson et al. | July 16, 1957 |
| 2,799,661 | De Rosset | July 16, 1957 |